(12) United States Patent
Rising

(10) Patent No.: US 6,495,108 B1
(45) Date of Patent: Dec. 17, 2002

(54) PHOTO-REMEDIATION OF $NO_2$ PLUME

(75) Inventor: Bruce Rising, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/898,737

(22) Filed: Jul. 3, 2001

(51) Int. Cl.[7] .............................. B01J 19/08; B01J 19/12
(52) U.S. Cl. ..................................... 422/186; 422/186.3
(58) Field of Search ........................... 204/157.3, 158.2; 250/492.1; 422/22, 24, 186, 186.3

(56) References Cited

U.S. PATENT DOCUMENTS

| | | |
|---|---|---|
| 3,869,362 A * | 3/1975 | Machi et al. ......... 204/157.1 R |
| 3,984,296 A | 10/1976 | Richards |
| 4,097,349 A | 6/1978 | Zenty |
| 4,146,450 A | 3/1979 | Araki et al. |
| 4,416,748 A | 11/1983 | Stevens |
| 4,995,955 A | 2/1991 | Kim et al. |
| 5,144,146 A * | 9/1992 | Wekhof .................... 250/492.1 |
| 5,489,777 A * | 2/1996 | Stedman et al. ......... 250/338.5 |

* cited by examiner

Primary Examiner—Edna Wong

(57) ABSTRACT

An photo-remediation method for reducing a visible $NO_2$ plume is provided. The method uses an illumination source having a wavelength of at least 350 nm, and preferably between 350–400 nm to irradiate gases within an exhaust path, and requires no additional steps or processing requirements for reduction of the visible plume.

3 Claims, 1 Drawing Sheet

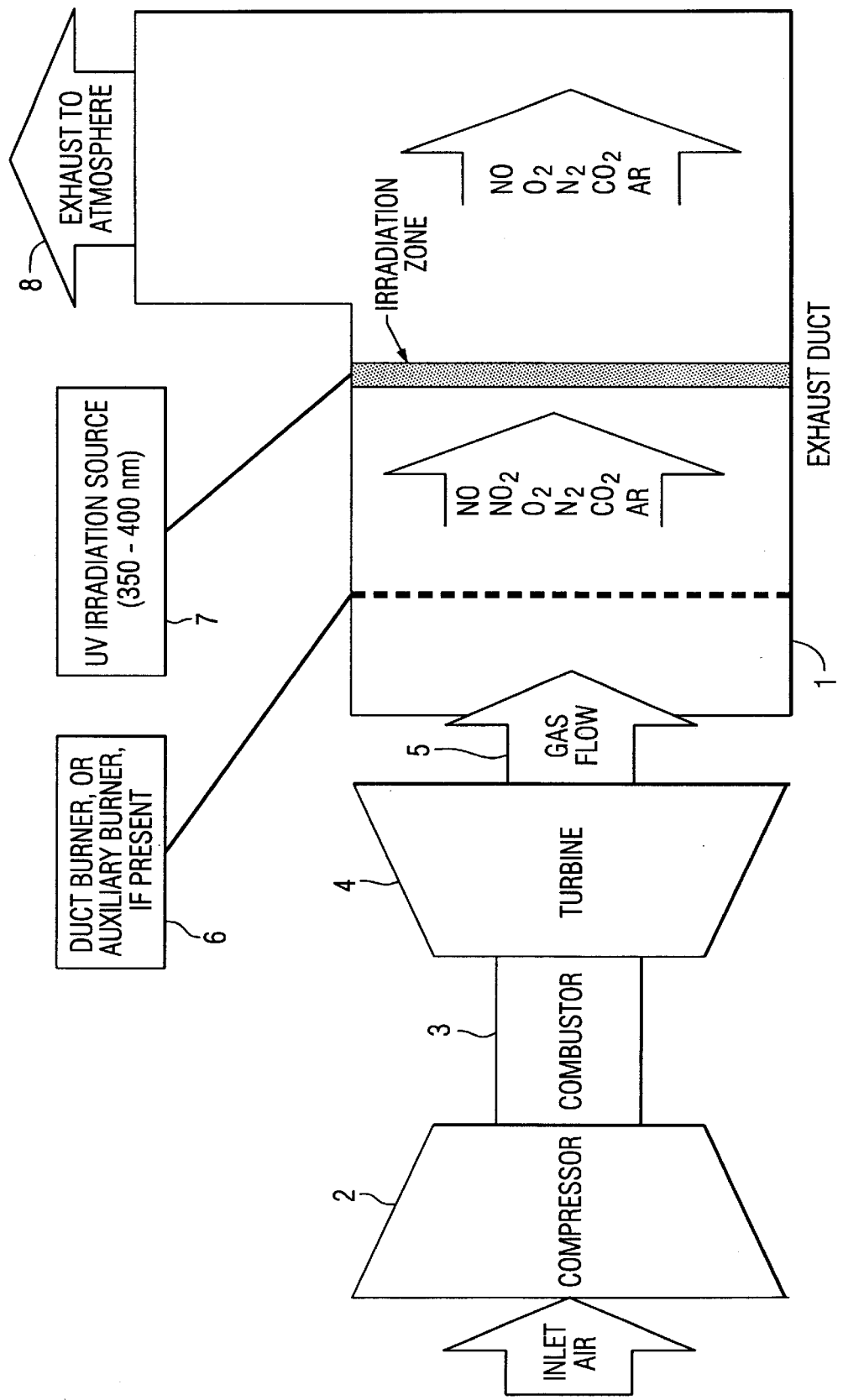

PHOTO-REMEDIATION OF NO₂ PLUME

BACKGROUND OF THE INVENTION

1. Field of the Invention

This invention relates to a method for reducing a visible $NO_2$ plume in an exhaust stack of a combustion or "gas" turbine power plant, other power plants or other combustion systems, including those in stationary or mobile applications.

2. Background Information

Combustion turbines used in power plants comprise a compressor section, a combustion section, and a turbine section. A supply of air is compressed in the compressor section and directed into the combustion section. Fuel enters the combustion section by means of a nozzle. The compressed air enters the combustion inlet and is mixed with the fuel, which is then combusted to produce a high-temperature, high-pressure gas. This gas then exits past the combustor section via a transition section and is injected into the turbine section to run the turbine.

The hot gases produced by the combustion section exit the power turbine and pass into a duct designed to convey these gases either to a heat exchanger (where additional energy is extracted) or directly to the exhaust stack. These exhaust gases will range in temperature from 600° F. to 1200° F. depending upon the type of fuel, the load on the engine, and the ambient temperature.

As a result of combustion, $NO_x$ (a mixture of NO and $NO_2$) is formed. The $NO_x$ produced by the gas turbine, or any subsequent post-combustion firing, is released into the atmosphere unless some control mechanism is used. The $NO_2$ component is a strong colorant in exhaust gases, and absorbs light in the blue region, including light in the wavelength between about 350–400 nm, resulting in a plume that appears from yellowish to orange-red.

The $NO_2$ plume is evident in many DLN (dry low $NO_x$) combustion systems, and determination of the actual source and mechanism of formation of $NO_2$ in DLN systems has proven to be an intractable problem, limiting options for controlling it. $NO_2$ may even be produced in conventional combustion turbine systems and also from some chemical processing facilities, such as nitric acid production plants. Control of $NO_2$ is important because, among other reasons, concentrations of only 20–30 ppm can produce a very objectionable plume.

$NO_2$ plumes may also be present in other combustion systems different from the gas turbine. These include pulverized coal (pc), fired boilers (operating according to the Rankine cycle), diesel engines, and gasoline engines (operating according to the Otto cycle). In particular, coal/oil energy systems and diesel cycle energy conversion systems produce significant $NO_x$ levels and may have a noticeable plume.

In gas turbine applications, $NO_x$ emissions are most often reduced using emission control systems which employ chemical means, such as ammonia injection in an SCR (selective catalytic reduction) system. Photometric methods have been studied in coal combustion where $NO_x$ is found in combination with other pollutants such as sulfur dioxide ($SO_2$). $SO_2$ and $NO_x$ are combustion products related to fuel burning associated with heat or power production. Photometric remediation methods include illumination or irradiation of the exhaust gases prior to subsequent processing steps, but all require additional steps or processing parameters during the reduction process in order for $NO_2$ to be reduced. Many of the photometric methods reviewed result in formation of undesirable byproducts such as sulfuric acid mist, ozone, and particulates.

For example, U.S. Pat. No. 4,995,955 (Kim et al.) discloses a process for reducing $NO_x$ contamination within an effluent stream using an ultraviolet light source having a wavelength of less than 220 nm. This method requires particle filtration or electrostatic precipitators to remove particles formed from the chemical processes used to clean the exhaust gases. Using a wavelength in this region causes the formation of ozone, a well-known component of urban smog.

U.S. Pat. No. 3,869,362 (Machi et al.) discloses a process for reducing $NO_x/SO_2$ emissions by controlling the ratio of $NO_x$ to $SO_2$ before introducing the gas mixture into an irradiation chamber. This method requires the presence of $SO_2$ and also additionally requires collecting chambers to cleanse the exhaust stream of mist and solid particles.

U.S. Pat. No. 3,984,296 (Richards) discloses a photochemical process for removing gaseous pollutant compounds (including $NO_x$) from a contaminant gas stream, by introducing positive and/or negative ions into the flue gas prior to irradiation. The ions form complexes with the pollutants which must be removed by precipitation or other methods.

U.S. Pat. No. 4,146,450 (Araki et al.) discloses a method for reducing or removing $NO_2$ from exhaust gases containing $NO_x$ using a catalytic reduction method with ammonia which has been previously excited by ultraviolet radiation.

It is desirable, therefore, to provide a method of exhaust gas $NO_2$ decomposition without the need for additional processing requirements such as additional chemicals, temperature control, particle collection of precipitates, or other processing steps.

SUMMARY OF THE INVENTION

Accordingly, the present invention provides a method of reducing a visible $NO_2$ plume in an exhaust stack by irradiating the exhaust gases within the duct or stack with at least one illumination source. The visible plume is substantially reduced while minimizing the formation of additional pollutants. This reduction may result in $NO_2$ concentrations of below 20–30 ppm, and may represent an $NO_2$ reduction of 90% or more in some cases. The reduction process is effective irrespective of the source of the $NO_2$ (including the combustion of fuel gas, oil, or solid fuel). The degree of reduction will be a function of, among other things, the initial $NO_2$ concentration, lamp intensity, and path length.

The illumination source can be placed directly within the exhaust duct/stack or optically coupled to these, and has a wavelength of light of at least 350 nm and preferably between 350 and 400 nm. The method does not require the presence of other chemicals or additional processing steps to achieve its desired reduction.

It is an object of the invention therefore to provide a method of reducing a visible $NO_2$ plume within the exhaust.

It is a further object of the invention to provide a method of reducing a visible $NO_2$ plume in exhaust gasses by irradiating the exhaust stack gasses with a source of illumination within the stack or optically coupled thereto.

It is an additional object of the invention to provide such a method of reducing a visible $NO_2$ plume without requiring the presence of other chemicals or other processing steps to achieve the desired reduction.

It is a further object of the invention to reduce a visible $NO_2$ plume in exhaust without producing undesirable by-products.

These and other objects of the invention will be apparent from the following description and appended claims.

BRIEF DESCRIPTION OF THE DRAWINGS

The invention is further illustrated by the following non-limiting drawing, in which:

FIG. 1 is a schematic representation of an exhaust path in a turbine engine having at least one illumination source to reduce the visible plume.

DESCRIPTION OF PREFERRED EMBODIMENTS

The present invention uses photo-remediation methods for reduction or elimination of a visible $NO_2$ plume in exhaust gases emitted from turbine engines, power plants, or any chemical process which releases $NO_x$ into the environment. More specifically (and referring now to FIG. 1), visible $NO_2$ emissions in an exhaust duct 1 of a combustion turbine engine, having a compressor section 2, a combustion section 3 and a turbine section 4. The turbine engine can optionally be equipped with a duct burner or auxiliary burner 6 which is another source of $NO_x$. The $NO_2$ is substantially reduced by photo-irradiating the exhaust gases 5 with at least one illumination source 7 located within the exhaust duct and/or stack or optically coupled thereto. The formation of secondary pollutants or byproducts (including sulfates and nitrates) is minimized, and additional processing steps are not required for removal.

The method takes advantage of low bonding energy that exists between the NO molecule and the additional oxygen (O) atom. This bonding energy is low in comparison to other species present in the exhaust ($CO_2$, $N_2$ etc.). A moderately short wavelength light source is sufficient to decompose the $NO_2$ compound and reduce the plume's visual appearance.

The source of illumination 7 is one or more lamps which can be located within the exhaust duct and/or stack 1 or optically coupled to either of these. Mercury vapor lamps are one class of source that produces the necessary wavelength of light, although other irradiation sources such as lasers or other high-energy sources may fulfill this requirement. Cooling and maintenance of the lamps located within the stack or duct may be required depending upon the exhaust gas conditions and the location of the illumination source. Optical coupling of the illumination source to the stack is an approach that allows placement of the illumination source in a location outside the duct where it can be easily maintained, cleaned and replaced as necessary. An optical fiber network can be used to connect the illumination source with the duct, with one end of the fiber lead placed at the illumination source and the other end of the fiber lead placed in the duct or stack. Preferably, the optical fiber network is fabricated from a material (such as silica-based fibers) exhibiting minimal losses in the UV region (about 300–400 nm), and with a high thermal stability. Optical coupling may also be accomplished through use of a focusing lens, reflective materials, or similar techniques known to produce, transmit, and direct visible light. Any method of optical coupling known to those skilled in the art may be used to link the illumination source to the duct or stack.

It may be desirable to use a purged-air system to maintain the lamps or the optical fiber interface, either on a continuous or periodic basis.

The bond dissociation energy of the NO—O bond is 305 KJ/kg-mole. Using the conversion $E=1.2\times E^{-4}$ kJ/mole/lambda, where lambda is in meters, 305 kJ/Mole corresponds to 393 nm radiation. Thus, a UV source with strong emission between 350 and 400 nm would be an appropriate method of irradiation. Use of wavelengths between 350–400 nm also decreases undesirable secondary reactions such as the formation of ozone.

The method of the present invention can be accomplished at any temperature, from ambient temperature up to temperatures of about 1,500° F. As the temperature increases, the wavelength of the light necessary to initiate the reaction to disassociate $NO_2$ into NO and O may be increased (the energy requirement of the light source is decreased).

In one embodiment, at least one illumination source 7 is installed in the exhaust path 1 prior to the gases exiting to the atmosphere 8. Alternatively, the illumination source 7 may be located outside the exhaust path and optically coupled to locations in the exhaust path. A fiber optic cable, not shown, may be used to provide such an optical coupling. In either arrangement, the exhaust gases should be in optical communication with the source of illumination 7.

Due to the prevention of undesirable secondary reactions and particulate matter, the need for other processing steps is advantageously eliminated. Physical methods such as scrubbers, temperature control, electrostatic precipitators and the like are unnecessary. It is also unnecessary to add other chemicals which facilitate precipitation or reduction of the pollutants by other mechanisms. While there can be some formation of ozone, ozone is unstable at the temperatures contemplated and is expected to break down; thus production of ozone is not expected to be a significant problem. Similarly, recombination of NO and O to form $NO_2$ is not expected to be a problem because the concentrations of NO and O will be very low; thus the likelihood of recombination is also very low.

Test results have shown that there is a strong relationship between the intensity of the illumination source (as measured in watts) and the decomposition rate of $NO_2$. Higher intensities revealed more rapid decomposition of the $NO_2$: when plotted, the results show a log-linear relationship between $NO_2$ concentration and time. Quantum efficiency (the number of photons required per molecule of NO2 dissociated) peaks at 390 nm; wavelengths much longer than this will not have sufficient energy to cause dissociation, while shorter wavelengths will not be as efficient in causing the dissociation of NO and O. The following example provides an estimate of lamp size requirements for a common exhaust, say from a combustion turbine power plant. Using a gas flow of 25 kg/hour of $NO_2$ and the above bond dissociation energy of 305 kJ/kg-mole, $$\frac{25 \text{ kg}}{\text{hour}} \times \frac{\text{kg} - \text{mole}}{46 \text{ kg}} \times \frac{305{,}000 \text{ Joules}}{\text{kg} - \text{mole}} \times \frac{\text{hr}}{3{,}600 \text{ sec}} = 46 \text{ watts}$$

A light source having 46 watts of radiative power near 393 nm is required for illumination of an exhaust stack having a flow rate of 25 kg/hour. Thus, it can be seen that the power required to accomplish the desired objectives is not significant.

Additionally, test results show that the rate of photo-dissociation of $NO_2$ to NO is temperature sensitive. At 150° C., the rate of dissociation using photometric techniques is approximately an order of magnitude greater that at 25° C.

Temperature may also play a role in the suitable wavelength. For example, the light source appropriate for gases having temperatures over 25° C. may have a wavelength longer than 400 nm.

This method is effective to reduce the presence of $NO_2$ by about 50%–90%, depending upon operational considerations. As a result, the concentration of $NO_2$ in exhaust gases may reduced to below 20 ppm and below 10 ppm, or even less.

While particular embodiments of this invention have been described above for purposes of illustration, it will be evident to those skilled in the art that numerous variations of the details of the present invention may be made without departing from the invention as defined in the appended claims.

What is claimed is:

1. A photo-remediation system suitable for reducing $NO_2$ within an exhaust gas, said system comprising:

a source of exhaust gas containing an amount of $NO_2$ sufficient to act as a visible colorant within said gas;

at least one illumination source in optical communication with said exhaust gas, said at least one illumination source adapted to produce light having a wavelength between about 350 nm to 400 nm; and at least one optical fiber connection between said at least one illumination source and said exhaust gas, whereby $NO_2$ within said exhaust gas is decomposed, thereby reducing the visibility of said colorant.

2. The photo-remediation system of claim 1 further including:

a cleaning system to maintain said optical communication between said at least one illumination source and said gas.

3. The photo-remediation system of claim 2 wherein said cleaning system includes a purged-air system.

* * * * *